United States Patent [19]

Fromm

[11] Patent Number: 4,502,045

[45] Date of Patent: * Feb. 26, 1985

[54] OPTICAL DEVICE FOR MONITORING CRITICAL SPEEDS OF A ROTATING MEMBER

[75] Inventor: Ingrid Fromm, Munich, Fed. Rep. of Germany

[73] Assignee: Siemens Aktiengesellschaft, Berlin and Munich, Fed. Rep. of Germany

[*] Notice: The portion of the term of this patent subsequent to Jun. 14, 2000 has been disclaimed.

[21] Appl. No.: 405,572

[22] Filed: Aug. 5, 1982

Related U.S. Application Data

[63] Continuation of Ser. No. 181,694, Aug. 27, 1980, abandoned.

[30] Foreign Application Priority Data

Sep. 12, 1979 [DE] Fed. Rep. of Germany ....... 2936908

[51] Int. Cl.³ .............................................. G08B 21/00
[52] U.S. Cl. .................................. 340/671; 324/175; 340/388
[58] Field of Search ....................... 340/671, 600, 388; 356/28; 324/175

[56] References Cited

U.S. PATENT DOCUMENTS

| 1,878,658 | 9/1932 | Aronoft | 324/175 |
|---|---|---|---|
| 3,218,636 | 11/1965 | Bernstein et al. | |
| 3,307,164 | 2/1967 | Zimmer | 324/175 |
| 3,312,829 | 4/1967 | Sprengers et al. | |
| 3,575,129 | 4/1971 | Sullivan | 324/175 |
| 3,729,047 | 4/1973 | Bohnlein et al. | 324/175 |
| 3,742,486 | 6/1973 | Skidmore | 324/175 |
| 4,031,466 | 6/1977 | Krause et al. | 324/175 |
| 4,037,157 | 7/1977 | Campbell | 324/175 |
| 4,093,853 | 6/1978 | Hunt | 324/175 |
| 4,162,399 | 7/1979 | Hudson | 324/175 |
| 4,183,017 | 1/1980 | Sims | 340/388 |
| 4,195,291 | 3/1980 | Burks, Jr. | 340/671 |
| 4,204,115 | 5/1980 | Boldridge, Jr. | 324/175 |
| 4,234,053 | 11/1980 | Erich | |
| 4,264,905 | 4/1981 | Shapiro | 324/175 |
| 4,297,538 | 10/1981 | Massa | 340/388 |
| 4,387,785 | 6/1983 | Fromm | 340/671 |

FOREIGN PATENT DOCUMENTS

| 898162 | 11/1953 | Fed. Rep. of Germany | 324/175 |
|---|---|---|---|
| 1018660 | 10/1957 | Fed. Rep. of Germany | 324/175 |
| 555573 | 10/1974 | Switzerland | 181/142 |
| 1279804 | 6/1972 | United Kingdom | 340/671 |
| 720406 | 3/1980 | U.S.S.R. | 324/175 |

OTHER PUBLICATIONS

Nelson et al., "Photophone Performance" *Jour. Accoust. Soc. Amer.*, 7/76, vol. 60, #1, pp. 251-255.

Kumar et al., "On R.P.M. and A. F. Meter" *J. Inst. Eng.* (India) *Electron & Telecommun. Eng. Div.* vol. 52, PtET4, No. 7 (MM. 1972) pp. 193-194.

*Primary Examiner*—Glen R. Swann, III
*Attorney, Agent, or Firm*—Hill, Van Santen, Steadman & Simpson

[57] ABSTRACT

An optical monitoring device includes a reflector, which is mounted on a surface of a rotating member adjacent the periphery to travel in a circular path, and a light source, which creates an input beam which either is directed at a given angle of incidence at a point on the circular path of the reflector or is directed through a waveguide at the point. The device also includes a second waveguide which is arranged on the path of light reflected by the reflector and conducts the reflected light to an opto-electrical transducer which converts the reflected light pulses into electrical pulses which are applied to a source of sound, such as a piezo ceramic plate with a resonator which creates an alarm when a certain frequency is reached.

14 Claims, 1 Drawing Figure

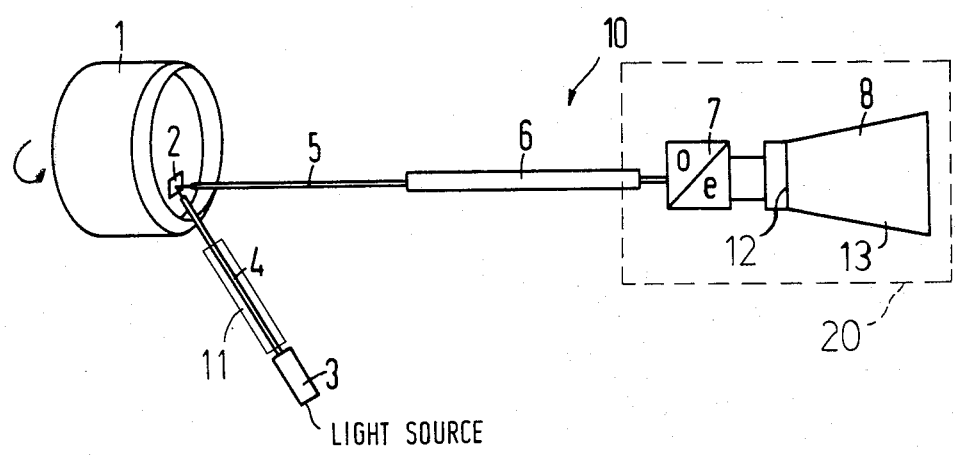

OPTICAL DEVICE FOR MONITORING CRITICAL SPEEDS OF A ROTATING MEMBER

CROSS-REFERENCE TO A RELATED APPLICATION

This application is a continuation of application Ser. No. 181,694, filed Aug. 27, 1980 and now abandoned.

BACKGROUND OF THE INVENTION

The present invention is directed to an optical device for monitoring critical speeds of a rotating member.

With rotating members, such as rotors, which are rotating at high speeds for example in turbines, centrifuges, machine shafts, problems will often occur. These problems are that a specific speed dare not be exceeded or that the appertaining device dare not be operated in a range of a critical speed.

Previously known methods of tachometry or, respectively, speed monitoring either make use of purely mechanical or made use of electromagnetic means. The measuring methods by means of purely mechanical means has many disadvantages such as relatively high wear and, thus, a short service life. In addition, the mechanical measuring method has the disadvantage, which due to the necessary mechanical coupling to the rotor, which is to be monitored, requires that the tachometer be installed at a location of the device to be monitored. Electromagnetic tachometry methods have the advantage with respect to pure mechanical tachometry methods because electromagnetic methods may have a special arrangement and they need not be bound to the location or site of the machine whose rotating member is being monitored. However, in certain cases, it might be disadvantageous that an electrical connection exist between the device to be monitored and the measuring and/or displaying means.

SUMMARY OF THE INVENTION

The present invention is directed to providing an optical device for monitoring critical speeds of a rotating member which device does not exhibit the above mentioned disadvantages. The optical device of the present invention provides a wear free arrangement which is neither bound to the location or site of the device to be monitored nor requires an electrical connection to the device to be monitored.

The inventive optical arrangement or device for monitoring critical speeds of a rotating member comprises at least one reflector being arranged on a surface of the rotating member near the periphery or in the proximity of the circumference of the member to rotate in a circular path, a light source creating an input beam, means, which are either the light source per se or a light waveguide, for directing the input beam from the light source along a path of a suitable angle of incidence at or toward a point on the circular path of the reflector so that the input beam is reflected as an output beam along a second path, said device including a waveguide arranged on the second path to receive the reflected beams created by the input beams striking the reflector, an opto-electrical transducer being connected to the light waveguide for converting the light pulses into electrical pulses, and sound means for generating an alarm being connected to an electrical output of said transducer.

The inventive optical device has the advantage that no mechanical moving parts are required. In addition, no electrical connections whatsoever are required between the rotating member of the device to be monitored and the optical device. Finally, a portion of the optical device can be positioned at a location such as a control room which is at a distance from the rotor or rotating member.

The light source may be either a coherent light source or an incoherent source and can either emit a steady constant or continuous light or can emit light pulses which are selected to agree with the critical speed and produce the desired frequency for the alarm of the sound means. The waveguide, which receives the reflected light beam may be a multifiber light waveguide or a single waveguide. The reflector may either be a partially mirroring of a surface of the rotating member, a glass prism, or a mirror which has been mounted on the surface of the moving member. The transducer may be either a photo element or a photo diode.

The sound means may comprise a piezo ceramic plate with a resonator, which exhibits a natural resonance which is matched to the pulse frequency of the output beam or the reflected beam which is produced at a critical speed of the rotating member.

BRIEF DESCRIPTION OF THE DRAWING

The FIGURE schematically illustrates the optical device of the present invention.

DESCRIPTION OF THE PREFERRED EMBODIMENTS

The principles of the present invention are particularly useful in an optical device or arrangement generally indicated at 10 in the FIGURE. The device 10 includes a reflector 2, which is arranged on a surface of a rotating member or rotor 1 which is to be monitored. As illustrated, the rotor 1 rotates as indicated by an arrow so that the reflector 2 which is adjacent a peripheral edge of the rotor 1 will move in a circular path.

The device 10 includes a light source 3, which creates an input beam 4 that is directed at the circular path of the reflector 2 along a path of a given angle of incidence so that when the input beam 4 strikes the reflector 2 an output beam 5 will be reflected along a second given path to be received by a light waveguide 6. If desired, the input beam can be conducted by a waveguide 11, which is illustrated in the FIGURE. As mentioned, the reflector 2 can be realized either as a mirror or a glass prism. The input beam 4, will be reflected by the reflector 2 when the member 1 is in a particular rotational position, and thus the reflected beam 5 will be composed of light pulses with each pulse signifying that the member was at the given position. The speed of the rotor 1 will determine the number of pulses per unit of time. This beam of pulses, which is received by the light waveguide 6, is conveyed or transmitted to an opto-electrical transducer 7. The opto-electrical transducer 7 has an electrical output connected to sound means 8 for creating an alarm.

In the illustrated embodiment, the opto-electrical transducer 7 is realized as a photo element. In the other embodiments, the transducer 7 can be a photo diode. The light source 3 of the sample embodiment is realized as a coherent light source for example a laser diode. However, the light source 3 can also utilize an incoherent light source, for example a light emitting diode or LED.

In accordance with the invention, the light source 3 can either emit a continuous light or a light pulse in accordance with the critical speed of the device to be monitored and the desired frequency of an alarm to be emitted by the sound means 8. Thus, the frequency of the light pulses of the source 3 and the critical speed of rotation will produce a pulse frequency in the reflected or output beam 5 which is the desired frequency for the alarm.

The sound means 8 is inventively realized as a piezoceramic plate 12 with a resonator 13. This resonator exhibits a natural resonance which is matched to the pulse frequency of the output beam 5 produced by the critical speed. To that end, the size of the piezoceramic plate is expediently selected in such a manner that its natural resonance coincides with the critical frequency. The resonator is matched to this critical frequency and serves for the acoustical amplification of the alarm which is to be emitted.

The sound means 8 constantly receives the electrical pulses from the transducer 7; however, in normal operation of the rotary member 1, the frequency of the electrical pulse will not be matched to the material resonance of the ceramic plate and no alarm will be created. However, when the rotating member reaches the critical speed, the frequency of the electric pulse will be matched to the natural resonance of the sound means which will then create an alarm sound signal.

Inventively, the light waveguide 6 can be a single optical fiber. In addition, the waveguide 6 can be composed of a bundle of optical fibers or a multifiber light waveguide.

The present invention is distinguished by its particular simplicity and its resistance to wear. It is also distinguished by the fact that no kind of electrical connection need exist between the appertaining machine space and the control room 20 in which the sound means may be present.

It is also possible in another embodiment of the invention to utilize a plurality of reflectors which are attached to the rotor. These reflectors are uniformly distributed so that a favorable matching between the appertaining critical speed and the resonance behavior of the piezoceramic plate and/or the resonator is rendered possible.

While the device has been described as creating an alarm when the critical speed of the rotating member 1 is reached, it is also possible that the output from the opto-electrical transducer 7 be connected to suitable equipment so that the entire speed range of the device can be monitored. Such suitable equipment would be an electrical display connected to the output of the transducer 7.

Although various minor modifications may be suggested by those versed in the art, it should be understood that I wish to embody within the scope of the patent granted hereon, all such modifications as reasonably and properly come within the scope of my contribution to the art.

I claim:

1. An optical device for monitoring critical speeds of a rotating member having a periphery, said device including at least one reflector being arranged on a surface of the rotating member near the periphery of the member to rotate in a circular path, means for directing an input light beam along a path toward a point on the circular path of the reflector to create a reflected beam pulse on a reflected beam path each time the input beam is reflected by the reflector, a light waveguide being arranged on the reflected beam path at an interval from the circular path to receive the reflected beam pulses from said reflector, an opto-electrical transducer being connected to said light waveguide to receive the reflected beam pulses and to convert the beam pulses into electrical pulses, and sound means for generating an alarm being directly connected to an electrical output of said transducer, said sound means comprising a piezoceramic plate with a resonator, said resonator having a natural resonance which is matched to a given pulse frequency of the reflected beam pulses when the rotating member is at said critical speed, said sound means generating an alarm in response to said given pulse frequency of electrical pulses from the transducer so that at normal speeds for the rotating member the electrical pulses applied to the sound means do not create an alarm signal, but at critical speeds the frequency of the electrical pulses is matched to the given pulse frequency and the sound means emits an alarm.

2. An optical device according to claim 1, wherein the means for directing includes a coherent light source.

3. An optical arrangement according to claim 1, wherein the means for directing includes an incoherent light source.

4. An optical device according to claim 1, wherein the reflector is a mirror secured on said rotating member.

5. An optical device according to claim 1, wherein the reflector is a glass prism secured on the rotating member.

6. An optical device according to claim 1, wherein the reflector is provided by partially mirroring a portion of the surface of the rotating member.

7. An optical device according to claim 1, wherein the waveguide consists of a multifiber light waveguide.

8. An optical device according to claim 1, wherein the means for directing includes a light source emitting a continuous input light beam.

9. An optical device according to claim 1, wherein the means for directing includes a light source emitting a pulsed light beam, said pulsed light beam having a frequency selected so that at the critical speed for the rotating member the reflected pulses are at the given pulse frequency to produce said alarm.

10. An optical device according to claim 1, wherein the opto-electrical transducer and the sound means are located in a central room at a distance from the rotating member.

11. An optical device according to claim 1, wherein said opto-electrical transducer is a light sensitive element.

12. An optical device according to claim 1, wherein said opto-electrical transducer is a photo diode.

13. An optical device according to claim 1, wherein the means for directing comprises a light source producing the input beam and directing the beam along the input path towards said point.

14. An optical device according to claim 1, wherein the means for directing comprises a light source producing an input beam and a waveguide receiving the input beam from the light source and directing it along the input path toward said point.

* * * * *